(12) United States Patent
Araki et al.

(10) Patent No.: US 8,330,756 B2
(45) Date of Patent: Dec. 11, 2012

(54) METHOD AND PROGRAM OF VISUALIZING STRUCTURED GRID DATA

(75) Inventors: Fumiaki Araki, Kanagawa (JP); Akira Kageyama, Kanagawa (JP)

(73) Assignee: Japan Agency for Marine-Earth Science and Technology (JP)

( * ) Notice: Subject to any disclaimer, the term of this patent is extended or adjusted under 35 U.S.C. 154(b) by 1200 days.

(21) Appl. No.: 11/910,184

(22) PCT Filed: Mar. 30, 2006

(86) PCT No.: PCT/JP2006/306668
§ 371 (c)(1),
(2), (4) Date: Sep. 28, 2007

(87) PCT Pub. No.: WO2006/106829
PCT Pub. Date: Oct. 12, 2006

(65) Prior Publication Data
US 2010/0026683 A1      Feb. 4, 2010

(30) Foreign Application Priority Data
Mar. 30, 2005   (JP) ................................ 2005-097028

(51) Int. Cl.
*G06T 15/00*   (2011.01)
(52) U.S. Cl. ........................................ 345/419; 345/655
(58) Field of Classification Search .................. 345/419, 345/655
See application file for complete search history.

(56) References Cited

U.S. PATENT DOCUMENTS
2004/0061933 A1 *   4/2004   Hack ............................. 359/443

FOREIGN PATENT DOCUMENTS
JP   2001-243500   9/2001
JP   2003-308535   10/2003

OTHER PUBLICATIONS

Akira Kageyama and Tetsuya Sato "Yin-Yang grid": An overset grid in spherical geometry; Sep. 11, 2004; G3; vol. 5, No. 9; pp. 3-5.*
"The 'Yin-Yang Grid': A Chimera Grid for the Spherical Geometry" presented by Akira Kageyama, Dec. 2003.
"Dynamical Validation by Shallow Water Equations on Yin-Yang Grid" presented by Keiko Takahashi et al., Dec. 2003.
"Development of a Nonhydrostatic AGCM with the Yin-Yang Mesh Method" presented by Keiko Takahashi et al., Dec. 2003.
"Solid Earth Simulation" presented by Akira Kageyama, Dec. 2003.

* cited by examiner

*Primary Examiner* — Maurice L McDowell, Jr.
(74) *Attorney, Agent, or Firm* — Benesch, Friedlander Coplan & Aronoff LLP

(57) ABSTRACT

Grid structured data arranged for a spherical structured grid constituted by combining two component structured grids are visualized by using computer graphics technology. Coordinate conversion means 31 converts grid point coordinates of first and second component structured grids (referred to as N and E systems, respectively), represented by specific regions in spherical coordinates, into local xyz coordinates used in computer graphics. Filter means 32 obtains first and second graphic objects for the N and E systems, respectively. Using E system rotation and N and E system synthesis means 33, the second graphic object for the E system is rotated by 90 degrees with respect to an x axis of a first local xyz coordinate system, and is then rotated by 180 degrees with respect to a z axis of the first local xyz coordinate system, thereby obtaining the rotated second graphic object for the E system, and then, both of the graphic objects are synthesized.

12 Claims, 8 Drawing Sheets

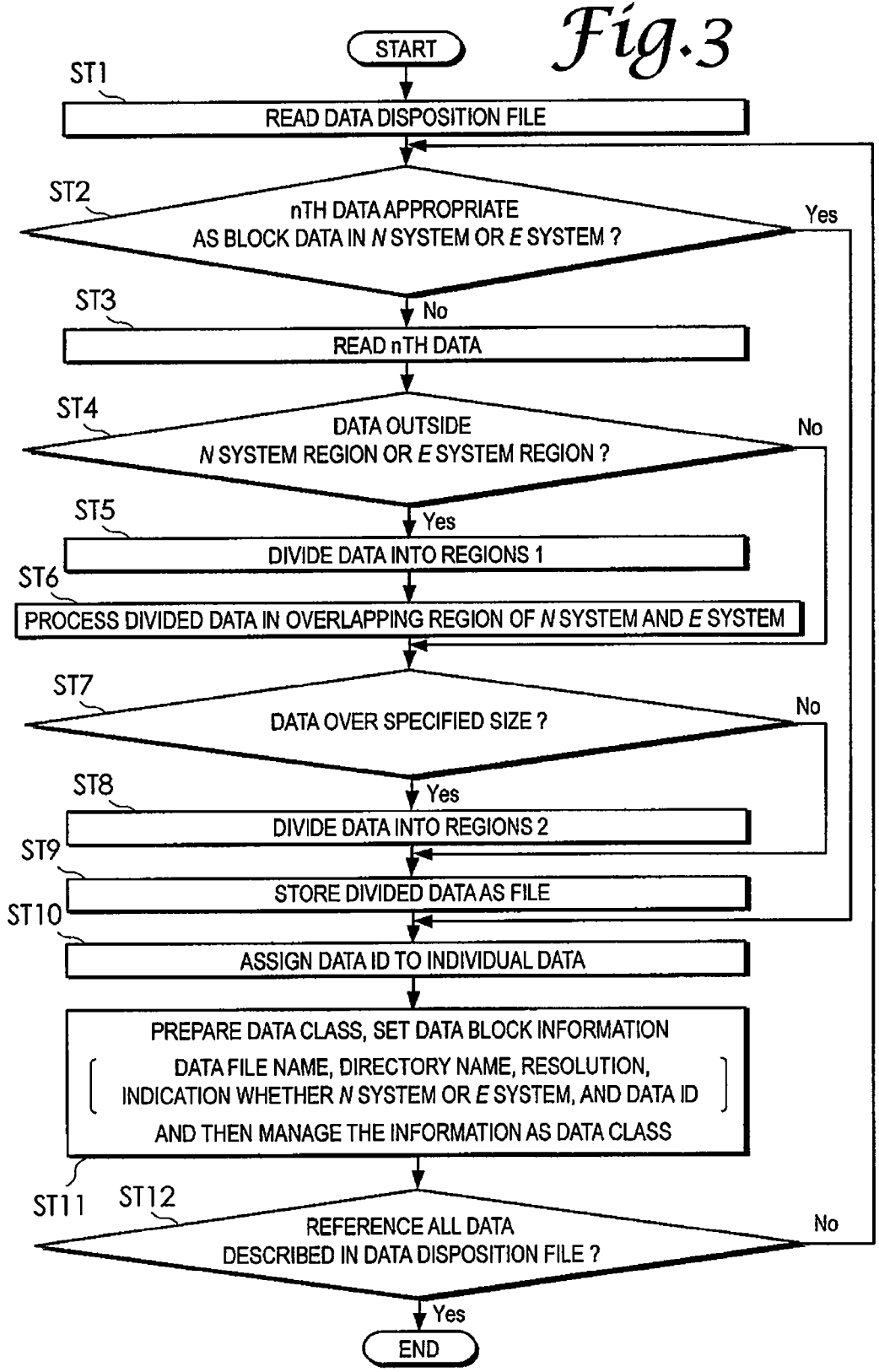

METHOD AND PROGRAM OF VISUALIZING STRUCTURED GRID DATA

TECHNICAL FIELD

The present invention relates to a method and a computer program of visualizing structured grid data, which allows visualization of the structured grid data arranged on a spherical structured grid intended for simulation, using computer graphics technology.

BACKGROUND ART

A spherical coordinate system is expressed by a radial distance and two angles of deviation. In the spherical coordinate system, any point on a straight line that passes through the North Pole (at 90 degrees latitude) and the South Pole (at −90 degrees latitude) is a singularity. Although angle intervals measured in a longitude direction are the same, lengths in the longitude direction corresponding to the respective angle intervals are different at different latitudes. In other words, although angle intervals measured in the longitude direction are the same, a longitude direction length corresponding to an angle interval at high latitude becomes smaller than a longitude direction length corresponding to an angle interval at low latitude. Accordingly, in the spherical grid formed by giving appropriate grid intervals respectively to latitudes and longitudes in the spherical coordinate system, a higher latitude region becomes dense with an increasing number of grid points. Accordingly, in the simulation where numerical computation is performed on each grid point based on the spherical coordinate system, inefficient computation is unavoidable in the high latitude region.

In order to allow a large-scale parallel-type simulation which is free from the above-mentioned issues specific to the spherical coordinate system and aims at reducing computation load, a new spherical structured grid for simulating various phenomena in geophysical fluid dynamics was presented in different papers at the 17th Fluid Mechanics Symposium, held in December 2003 (Paper F8-1 entitled "The "Yin-Yang Grid": A Chimera Grid for the Spherical Geometry" presented by Akira Kageyama; Paper C6-2 entitled "Dynamical validation by shallow water equations on Yin-Yang grid" presented by Keiko Takahashi, Mitsuru Ohdaira, Akira Kageyama, and Kunihiko Watanabe; Paper C6-3 entitled "Development of a nonhydrostatic AGCM with the Yin-Yang mesh method" presented by Keiko Takahashi, Kenji Komine, Akira Kageyama, and Kunihiko Watanabe). This new spherical structured grid was also presented at the 7th Simulation Science Symposium held in October 2003 (as shown in the paper entitled "Solid Earth Simulation" presented by Akira Kageyama). This new spherical structured grid is commonly called as Yin-Yang grid. The Yin-yang grid is formed in such a manner that first and second component structured grids are complementarily combined with each other to form a sphere. The first component structured grid is constituted by extracting from a latitude-longitude grid on a first spherical coordinate system a range between a certain value of −45 degrees or less and a value of 45 degrees or more (excluding −90 and 90 degrees) in latitude and a range between a certain value of 45 degrees or less and a certain value of 315 degrees or more (excluding 0 and 360 degrees) in longitude. The first spherical coordinate system uses a z axis of an xyz space as a central axis. The second component structured grid is constituted by extracting from a latitude-longitude grid on a second spherical coordinate system a range between a certain value of −45 degrees or less and a certain value of 45 degrees or more (excluding −90 and 90 degrees) in latitude and a range between a certain value of 45 degrees or less and a certain value of 315 degrees or more (excluding 0 and 360 degrees) in longitude. The second spherical coordinate system uses a y axis of the xyz space as a central axis. First and second structured grid data are respectively arranged for the first and second component structured grids, which constitute the spherical structured grid.

DISCLOSURE OF THE INVENTION

Problems to be Solved by the Invention

When visualizing the structured grid data in a common spherical structured grid based on the spherical coordinate system, an issue similar to the one as presented by the simulation described before will arise. In the visualization using computer graphics technology, by referring to coordinates of each grid point and data arranged on the coordinate of each grid point, vertex coordinates of a polygon (a triangle as a basic element constituting the surface of a graphic object in computer graphics) are computed, and coloring is performed based on a value of the data arranged on the grid point. Accordingly, in the high latitude region densely populated with grid points of a structured grid based on the spherical coordinates, polygon creation and normal computation at the vertex of a polygon are inevitably carried out more than necessary in light of the display resolution of a monitor. Further, when converting data from the structured grid data based on the spherical coordinates to structured grid data based on three-dimensional orthogonal coordinates, data processing such as data interpolation and data reduction, which depends on the size of a grid interval of each structured grid, is accompanied. For this reason, processed data loses a one-to-one association between the original data and the resolution, and accordingly the original data cannot be faithfully represented. When the new spherical grid described before is applied to the visualization, and the structured grid data can be visualized, dense population of polygons in the high latitude region of the sphere may be avoided, thereby increasing processing efficiency, and suppressing the lowering of accuracy in the association with original structured grid data.

In the visualization, unlike the simulation, it is not necessary to refer to or reference structured grid data on all grid points of the spherical structured grid. In the simulation, the structured grid data on all the grid points are important data required for exchange of numerical data between the two component structured grids and interpolation processing, which are performed in order to maintain consistency in the simulation over the whole sphere. In the visualization, however, it is not necessary to use the structured grid data on all the grid points, except for a minimal overlapping portion of the grid that prevents generation of spacing between graphic objects obtained by referring to or referencing the structured grid data on the first and second component structured grids described before. Conversely, when the structured grid data on all the grid points are used, a load on the polygon creation and normal computation on the polygon vertex will increase. Further, unwanted irregularities that are not originally intended are generated in overlapping portions between the graphic objects. As a result, an image after the visualization becomes unclear. These unwanted overlaps must be avoided.

In the spherical structured grid, grid data on the rear side of the grid viewed from the monitor are hidden behind the graphic objects on the front side even after they have been visualized. For this reason, the grid data on the rear side are not displayed on the monitor. When the polygon creation and the normal computation on the polygon vertex are performed on these data one by one, the load on the processing will increase, thereby resulting in inefficient visualization. When the structured grid data to be visualized are selectively visualized, fast and efficient visualization may be expected.

An object of the present invention is to provide a method and a computer program of visualizing structured grid data arranged on a spherical structured grid formed by combining two component structured grids, using computer graphics technology.

Another object of the present invention is to provide a method and a computer program of visualizing structured grid data, which can improve efficiency in visualization.

Means for Solving the Problems

Structured grid data to be visualized by a method of visualizing structured grid data according to the present invention are arranged on a spherical structured grid. This spherical structured grid is constituted by combining first and second component structured grids. The first component structured grid is constituted by extracting from a latitude-longitude grid on a first spherical coordinate system a range between a certain value of −45 degrees or less and a certain value of 45 degrees or more (excluding −90 and 90 degrees) in latitude and a range between a certain value of 45 degrees or less and a certain value of 315 degrees or more (excluding 0 and 360 degrees) in longitude. The first spherical coordinate system uses a z axis of an xyz space as a central axis. The second component structured grid is constituted by extracting from a latitude-longitude grid on a second spherical coordinate system a range between a certain value of −45 degrees or less and a certain value of 45 degrees or more (excluding −90 and 90 degrees) in latitude and a range between a certain value of 45 degrees or less and a certain value of 315 degrees or more (excluding 0 and 360 degrees) in longitude. The second spherical coordinate system uses a y axis of the xyz space as a central axis. Then, the structured grid data on the spherical structured grid is constituted by first and second structured grid data arranged for the first and second component structured grids, respectively. In the method of the present invention, the structured grid data constituted by the first and second structured grid data are visualized on a monitor using computer graphics technology.

Then, in the present invention, the visualization is implemented by first and second creation steps, a rotation step, and a visualization step which will be described below. First, in the first creation step, the first component structured grid is set in a first local xyz coordinate system used in computer graphics. Next, the first structured grid data are disposed on the first component structured grid, and a first graphic object is created by the computer graphics technology. In the second creation step, the second component structured grid is set in a second local xyz coordinate system used in the computer graphics. Then, the second structured grid data are disposed on the second component structured grid, and a second graphic object is created by the computer graphics technology. In the rotation step, the second graphic object is rotated by 90 degrees with respect to an x axis of the first local xyz coordinate system, together with the second local xyz coordinate system, and then rotated by 180 degrees with respect to a z axis of the first local xyz system. Since the first local xyz coordinate system for the first graphic object and the second local xyz coordinate system for the second graphic object have the common xyz coordinate axes, the first and second graphic objects are overlapped with each other when visualized without alteration. For this reason, the rotation step is carried out. In the visualization method of the present invention, rotation of the second local coordinate system is performed by the step of rotation, as described before.

In the visualization step, the first graphic object and the rotated second graphic object are combined, and the structured grid data are thereby visualized on the monitor as an image, using the computer graphics technology.

Incidentally, instead of the "rotation step" of actually rotating the local coordinate system as described before, a coordinate conversion step using axis replacement may be employed. In this coordinate conversion step, by replacing x, y, and z axes of the xyz coordinate system for defining coordinate values of each grid point on the second component structured grid by −x, z, y axes, respectively, the coordinate of each grid point on the second component structured grid is converted. The graphic objects are created after the coordinate conversion. The coordinate conversion may also create the graphic object of the second component structured grid, which is equivalent to the one obtained by the rotation, required for visualization using the computer graphics technology.

In order to implement this operation, a first setting step, a second setting step, a coordinate conversion step, and a visualization step are performed. In the first setting step, coordinate value of each grid point on the first component structured grid is set using an xyz coordinate system. In the second setting step, a coordinate value of each grid point on the second component structured grid is set using an xyz coordinate system. Then, in the coordinate conversion step, a coordinate of each grid point on the second component structured grid is converted so that the x, y, and z axes for defining the coordinate value of each grid point on the second component structured grid become the −x, z, and y axes, respectively, as seen from the x y z coordinate system for defining the coordinate value of each grid point on the first component structured grid. Then, in the visualization step, using the first component structured grid, second component structured grid having the converted coordinates, and the first and second component structured grid data, the respective graphic objects of the first and second component structured grids are created, combined, and represented on the monitor as an image by the computer graphics technology.

Preferably, the method of visualization further comprises a determination step of determining an overlapping region where the first component structured grid overlaps with the second component structured grid that has been subject to the rotation of the coordinate system or coordinate conversion. Then, the structured grid data disposed on either the first component structured grid or the second component structured grid which has been subject to the rotation of the coordinate system or the coordinate conversion are visualized with respect of the overlapping region in the visualization step. With this arrangement, even if the overlapping portion of the two component structured grids is present, duplication of polygon creation necessary for the visualization is eliminated. Accordingly, a load on the polygon creation may be reduced. For this reason, unwanted irregularities that are not originally intended but are generated in a polygon overlapping portion may be suppressed on a graphic object surface, thereby preventing the visualized image from becoming unclear. In order to visualize the structured grid data corresponding to a point on either one of the structured grids in the overlapping region, an invalid value should be set to the structured grid data so that the structured grid data located on this region is zero, or a region determination criterion should be defined, thereby avoiding needless polygon creation and needless normal computation on the polygon vertex.

Further, it is not necessary to create the graphic object on the grid in a region that runs out of a display frame of the monitor and is not therefore displayed. Hence, it is preferable that each of the first and second structured grid data are respectively constituted by a plurality of divided structured grid data. Then, the divided structured data, which are minimally required for representation as the image on the monitor, should be selected from among the first and second structured grid data and should be visualized. In other words, a plurality of divided structured grids where a plurality of divided structured grid data are respectively arranged are provided. Then, it is determined which one of the divided structured grids that form the spherical structured grid should be referred to or referenced. With this arrangement, an advantage is obtained that the total number of grid points on the spherical structured grid to be referred to may be reduced and a load on the polygon creation and normal computation on the polygon vertex may be reduced. Generally, structured grid data outputted in a large-scale parallel-type simulation are often divided into a lot of fine regions. In contrast therewith, in a visualization program, one or a few pieces of structured grid data are often read and visualized. When many divided structured grid data can be used without alteration, namely, without being grouped into the one or few pieces of structured grid data, and then can be automatically selected and visualized, an advantage of reduction in operating efficiency may also be obtained.

A computer program according to the present invention is the program installed on a computer for use, for visualizing structured grid data on a monitor using computer graphics technology. In other words, this program is the structured grid data visualization program installed on the computer for use, for visualizing on the monitor first and second structured grid data arranged for first and second component structured grids of a spherical structured grid, using the computer graphics technology. The spherical structured grid is constituted by complementarily combining the first component structured grid and the second component structured grid to form a sphere. The first component structured grid is constituted by extracting from a latitude-longitude grid on a first spherical coordinate system a range between a certain value of −45 degrees or less and a certain value of 45 degrees or more (excluding −90 and 90 degrees) in latitude and a range between a certain value of 45 degrees or less and a certain value of 315 degrees or more (excluding 0 and 360 degrees) in longitude. The first spherical coordinate system uses a z axis of an xyz space as a central axis. The second component structured grid is constituted by extracting from a latitude-longitude grid on a second spherical coordinate system a range between a certain value of −45 degrees or less and a certain value of 45 degrees or more (excluding −90 and 90 degrees) in latitude and a range between a certain value of 45 degrees or less and a certain value of 315 degrees or more (excluding 0 and 360 degrees) in longitude. The second spherical system uses a y axis of the xyz space as a central axis. The program of the present invention implements following functions, using the computer: a first creation function of setting the first component structured grid in a first local xyz coordinate system used in computer graphics, disposing the first structured grid data on the first component structured grid, and creating a first graphic object by the computer graphics technology; a second creation function of setting the second component structured grid in a second local xyz coordinate system used in the computer graphics, disposing the second structured grid data on the second component structured grid, and creating a second graphic object by the computer graphics technology; a rotation function of rotating the second graphic object by 90 degrees with respect to an x axis of the first local xyz coordinate system, together with the second local coordinate system, and then rotating the resulting second graphic object by 180 degrees with respect to a z axis of the first local xyz coordinate system; and a visualization function of visualizing a graphic object, which has been obtained by combining the first graphic object and the rotated second object, on said monitor as an image, using said computer graphics technology.

Another visualization program of the present invention is configured to cause the computer to implement following functions: a first setting function of setting a coordinate value of each grid point on the first component structured grid using an xyz coordinate system: a second setting function of setting a coordinate value of each grid point on the second component structured grid using an xyz coordinate system; a coordinate conversion function of converting the coordinate of each grid point on the second component structured grid so that x, y, and z axes for defining the coordinate value of each grid point on the second component structured grid become −x, z, and y axes, respectively, as seen from the xyz coordinate system for defining the coordinate value of each grid point on the first structured component grid; and a visualization function of visualizing a graphic object on the monitor as an image, using the computer graphics technology, wherein the graphic object is obtained by creating respective graphic objects of the first and second component structured grids using the first component structured grid, the second component structured grid having the converted coordinate values, the first structured grid data, and the second structured grid data, and combining the respective graphic objects.

Preferably, the visualization program further implements a determination function of determining whether or not there is an overlapping region where the first component structured grid overlaps with the second component structured grid having the converted coordinate values, as shown in FIG. 2. The determination function is implemented in the visualizing function of visualizing the graphic object on the monitor. When it is determined that the overlapping region exists, invalid values are detected for either the structured grid data disposed on the first component structured grid or the structured grid data disposed on the second component structured grid having the converted coordinate values, or a region determination condition is defined, thereby avoiding unnecessary polygon creation and normal computation on the polygon vertex. When the visualization is performed as described above, presence of the overlapping region poses no problem.

Further, it is not necessary to create the graphic object on the grid in a region that runs out of a display frame of the monitor and is not therefore displayed. As described before, a plurality of divided structured grids where a plurality of divided structured grid data are respectively arranged, are provided. Then, it is determined which one of the divided structured grids that form the spherical structured grid should be referred to. With this arrangement, the total number of grid points on the spherical structured grid to be referred to may be reduced. Further, the load on the polygon creation may be reduced. Preferably, the program of the present invention further implements a selection function of using a lot of the divided structured grid data without alteration, namely, without grouping the divided structured grid data into one or a few pieces of structured grid data, and then making automatic selection for visualization. Automatic selection of a necessary one or more from among the divided structured grids may substantially reduce the amount of data to be visualized.

According to the present invention, a loss in data resolution for the visualization after simulation may be suppressed. Further, an effect can be obtained in which an amount of memory use and time cost may be reduced in data extraction and drawing processing for the visualization. When a structured grid with each grid interval in latitude and longitude directions being one degree is used, the total number of grid points on ordinary spherical coordinates is 360×180×(the number of grid points in a radius direction). In contrast therewith, when each of the first component structured grid (N system) and the second component structured grid (E system) is defined to range from 45 to 315 degrees in the longitudinal direction and from −45 to 45 degrees in the latitude direction, the number of grid points on each component structured grid is 270×90×(the number of grid points in the radius direction)×2. Accordingly, for a new spherical structured grid used for carrying out the present invention, a third quarter the number of the grid points on the grid of an ordinary spherical coordinate system suffices. For this reason, the total amount of data held on a memory may be reduced. In filter processing that extracts coordinate values of grid points and data values on the respective grid points based on a determined criterion, the number of the grid points to be referred to in order to draw a color contour or an isosurface, is reduced to three quarters, compared with the grid of the ordinary spherical coordinate system. For this reason, the number of polygons required for the drawing and the amount of normal computation on polygon vertex may also be reduced. A total processing time in a visualization function is thereby shortened. In a region where the N system overlaps with the E system, which is generated when the new spherical structured grid is employed, processing of (or invalid value substitution to) data of one of the systems may be performed in advance. With this arrangement, the polygon creation on one of the systems is not performed on that portion. Thus, unwanted processing time caused by duplicate drawing is avoided. Further, compared with processing in the ordinary spherical system, load balances may be made almost equivalent. Further, according to the present invention, an improvement in interactivity may be attained in an interactive visualization program, wherein fast response can be expected in displaying the result.

BRIEF DESCRIPTION OF THE DRAWINGS

FIG. 3 is a flowchart showing an example of an algorithm for the program used for implementing each function implementation means in an operation and control portion and a data processing portion.

BEST MODE FOR CARRYING OUT THE INVENTION

Figure 1:
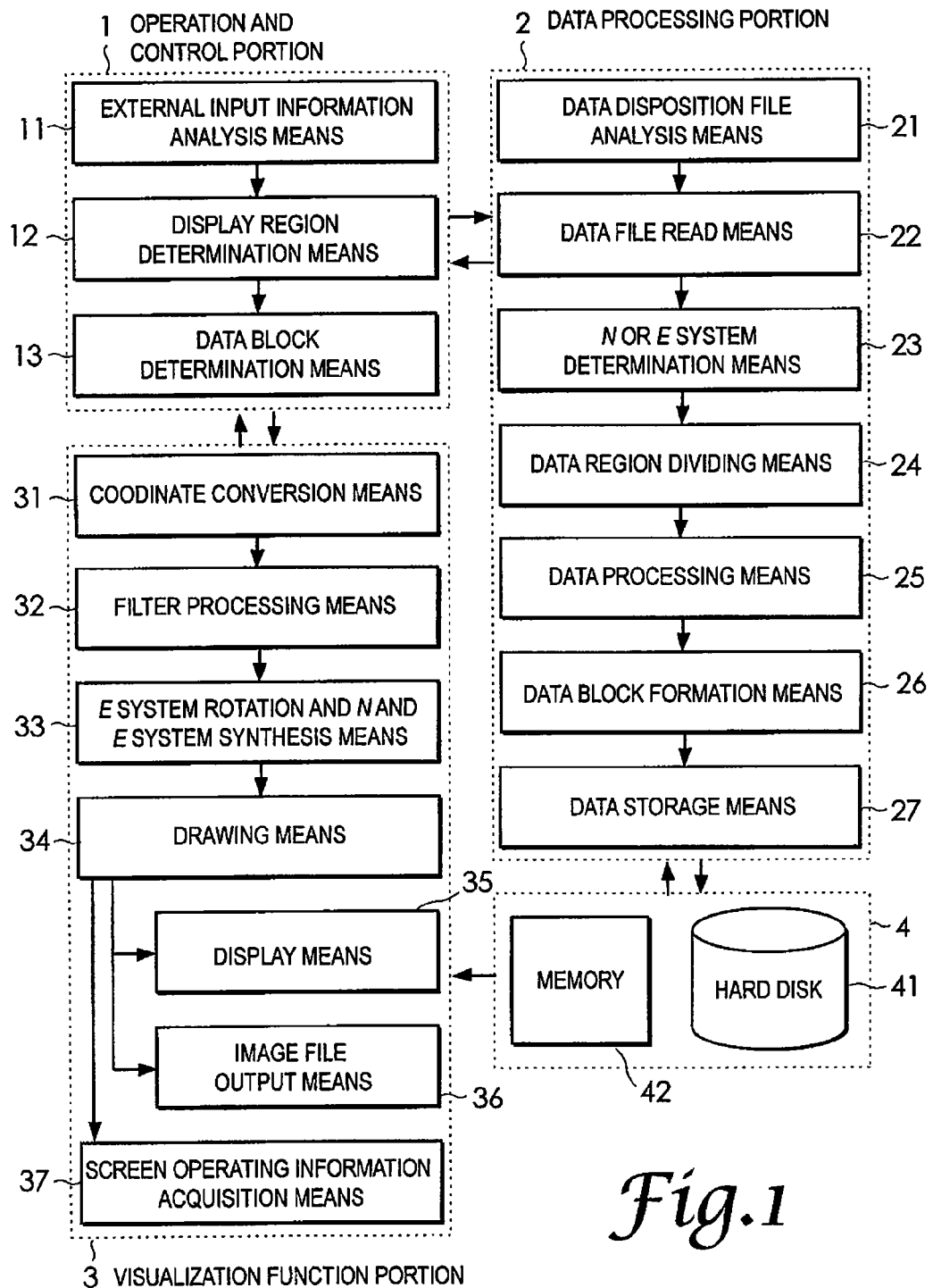
FIG. 1 is a block diagram illustrating a configuration according to an embodiment of the present invention, wherein each block represents each of function implementation means implemented in a computer in which a program according to the embodiment of the present invention is installed in order to carry out a method of visualizing structured grid data according to the present invention.
Figure 2A:
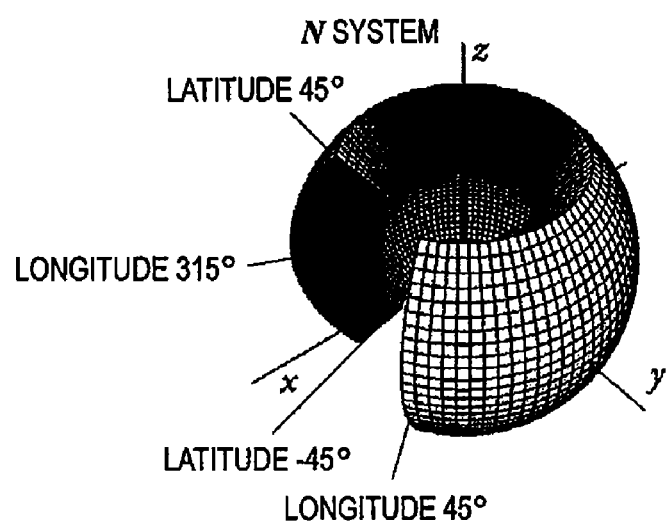
FIGS. 2A and 2B are respectively a conceptual diagram of a first component structured grid and a second component structured grid.
Figure 2B:
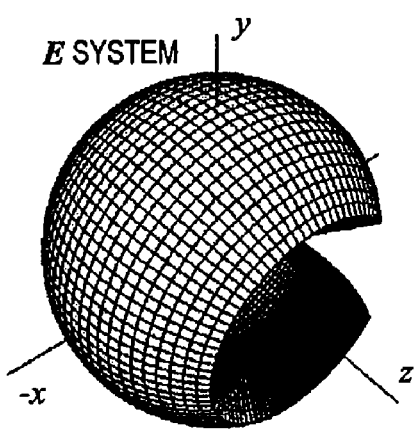
Figure 2C:
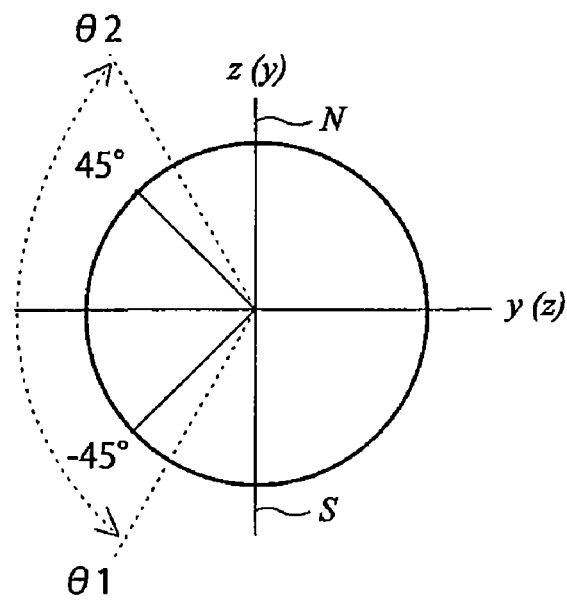
FIGS. 2C and 2D are respectively a diagram showing a latitude range and a longitude range.
Figure 2D:
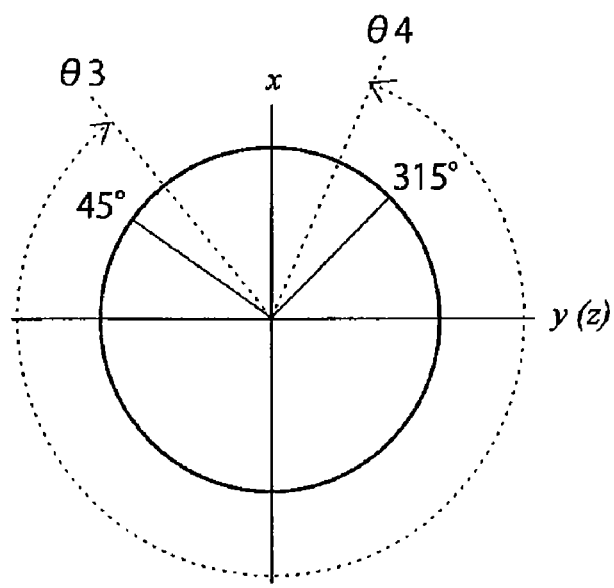

FIG. 1 is a block diagram illustrating a configuration according to an embodiment of the present invention, wherein each block represents each of function implementation means implemented in a computer where a program according to the embodiment of the present invention is installed in order to carry out a method of visualizing structured grid data according to the present invention. In this embodiment, an operation and control portion 1, a data processing portion 2, and a visualization function portion 3 are configured within the computer by installation of the program. A storage device 4 is hardware constituted from a hard disk 41 and a memory 42 provided for the computer. In this embodiment, a first component structured grid constituting a spherical structured grid is sometimes indicated by an N system, and a second component structured grid is sometimes indicated by an E system, for simplicity. As shown in FIGS. 2A and 2B, the spherical structured grid is constituted by combining the first and second component structured grids (N and E systems). The first component structured grid is constituted by extracting from a latitude-longitude grid on a first spherical coordinate system a range between a certain value of −45 degrees or less [−45 degrees latitude in FIG. 2A] and a certain value of 45 degrees or more [45 degrees latitude in FIG. 2A] (excluding −90 and 90 degrees) in latitude and a range between a certain value of 45 degrees or less [45 degrees longitude in FIG. 2A] and a certain value of 315 degrees or more [315 degrees longitude in FIG. 2A] (excluding 0 and 360 degrees) in longitude. The first spherical coordinate system uses a z axis of an xyz space as a central axis. The second component structured grid is constituted by extracting from a latitude-longitude grid on a second spherical coordinate system a range between a value of −45 degrees or less [−45 degrees in FIG. 2B] and a certain value of 45 degrees or more [45 degrees in FIG. 2B] (excluding −90 and 90 degrees) in latitude and a range between a certain value of 45 degrees or less [45 degrees in FIG. 2B] and a certain value of 315 degrees or more [315 degrees in FIG. 2B] (excluding 0 and 360 degrees) in longitude. The second spherical coordinate system uses a y axis of the xyz space as a central axis. Then, the structured grid data on the spherical structured grid is constituted by first and second structured grid data respectively arranged for the first and second component structured grids. The range of the latitudes to be extracted, described before, is the range from a value θ1 of −45 degrees or less to a value θ2 of 45 degrees or more, when viewed using the z axis in the N system and the y axis in the E system respectively as central axes, as shown in FIG. 2C. The range of the longitudes to be extracted is the range from a value θ3 of 45 degrees or less to a value θ4 of 315 degrees or more, when viewed using the z axis in the N system and the y axis in the E system respectively as the central axes.

When the program is started, external input information analysis means 11, display region determination means 12, and data block determination means 13 are implemented in the operation and control portion 1. Data disposition file analysis means 21, data file read means 22, N or E system determination means 23, data region dividing means 24, data processing means 25, data block formation means 26, and data storage means 27 are configured in the data processing portion 2. Coordinate conversion means 31, filter processing means 32, E system rotation and N and E system synthesis means 33, drawing means 34, display means 35, image file output means 36, and screen operating information acquisition means 37 are configured in the visualization function portion 3. Grid point coordinate data on the first and second component structured grids and first and second structured grid data arranged for these grid point coordinate data, which will be described later, are stored in the hard disk 41. The program is stored in the memory 42.

FIG. 3 is a flowchart showing an example of an algorithm for a routine that is a part of the program used for implementing each function implementation means in the operation and control portion 1 and the data processing portion 2. The program is configured to implement functions obtained by performing respective steps in the computer. When the operation and control portion 1 receives operating information from a user, the external input information analysis means 11 analyzes external information included in the operating information and gives an analysis result to the display region determination means 12. The display region determination means 12 determines whether a portion to be visualized, requested by the user is an overall region or a specific region, based on the analysis result, and outputs to the data processing portion 2 a command to read data necessary for the visualization. In other words, the display region determination means 12 sends the command to read a "data disposition file" from the hard disk 41 in the storage means 4 to the data processing portion 2 (in step ST1 in FIG. 3). The "data disposition file" to be read from the hard disk 41 refers to the file which contains information relating to a directory storing a plurality of data files, names of the files, a plurality of space resolution information (respective real value ranges and the respective numbers of grid points in latitude, longitude, and height directions), temporal steps, and respective system indicators (on the N system, E system, or otherwise) of the first and second component structured grids.

Figure 2E:
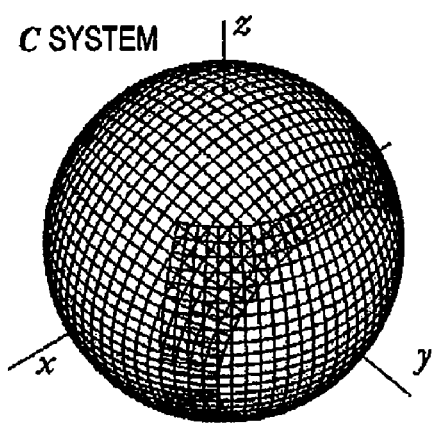
FIGS. 2E and 2F are respectively a diagram showing a spherical structured grid constituted by combining the first and second component structured grids and a diagram showing only an overlapping region of the first and second component structured grids.
Figure 2F:
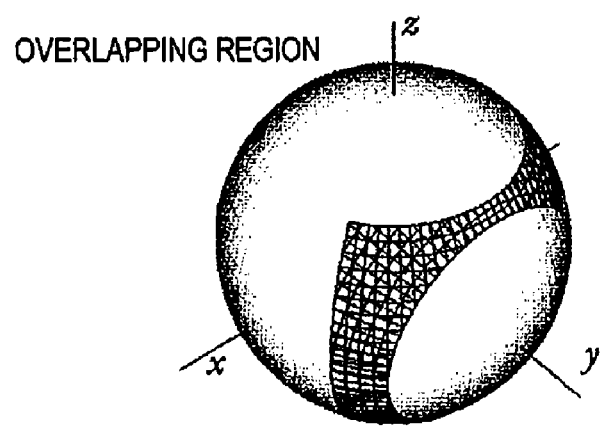

The data disposition file analysis means 21 of the data processing portion 2 analyzes contents of the "data disposition file" (in step ST2 in FIG. 3). Then, the data file read means 22 reads only a data file required to read into the computer (in step ST3 in FIG. 3). At this point, the N or E system determination means 23 determines if data does not fit into a form defined in advance or if a data size is large (in step ST4). Then, when there is a portion where the first component structured grid (N system) overlaps with the second component structured grid (E system) at the time of polygon creation, as shown in FIGS. 2E and 2F, the data region dividing means 24 is used to divide the data into a plurality of regions as needed (in step ST5 in FIG. 3). Then, the divided data is subjected to processing by the data processing means 25 (in step ST6 in FIG. 3). Then, it is determined whether the data exceeds a defined size or not (in step ST7). When the data exceeds the defined size, the data is divided by the data block forming means 26 so that the program properly operates, and the processed data is broken down into a plurality of blocks (standardized data clusters) (in step ST8). The data which have been divided into blocks (divided structured grid data) are stored in the storage device 4 through the data storage means 27 (in step ST9). At this point, a data ID is assigned to individual data. Then, the data processing portion 2 sends data block information to the operation and control portion 1. The operation and control portion 1 determines parameters (such as the data block information required for drawing, a kind of drawing, and coordinate values in a drawing range) required for visualization through the data block determination means 13 by combining a next operation externally entered, such as command input or mouse operation by the user, with the data block information. Then, the operation and control portion 1 sends these parameters to the visualization function portion 3 through the data block determination means 13. Specifically, as shown in step ST11 in FIG. 3, a data class is provided, the data block information is set thereinto, and then managed as the data class thereafter. Then, all data described in the data disposition file are referred to in step ST12. When referring to all the data has been completed, the operation is finished. When referring to the data has not been completed, the process is returned to step ST2. Then, until a next operation is carried out by the user, the process stands by there.

Assume that the first and second structured grid data are constituted by the divided structured grid data obtained by division into a plurality of the data as described above. Then, when a command for visualization is entered by the user, the visualization function portion 3 selects only a data block required for visualization (the divided structured data minimally required for representation as an image on the monitor) from the storage device 4, and inputs and visualizes the selected data block.

Figure 4:
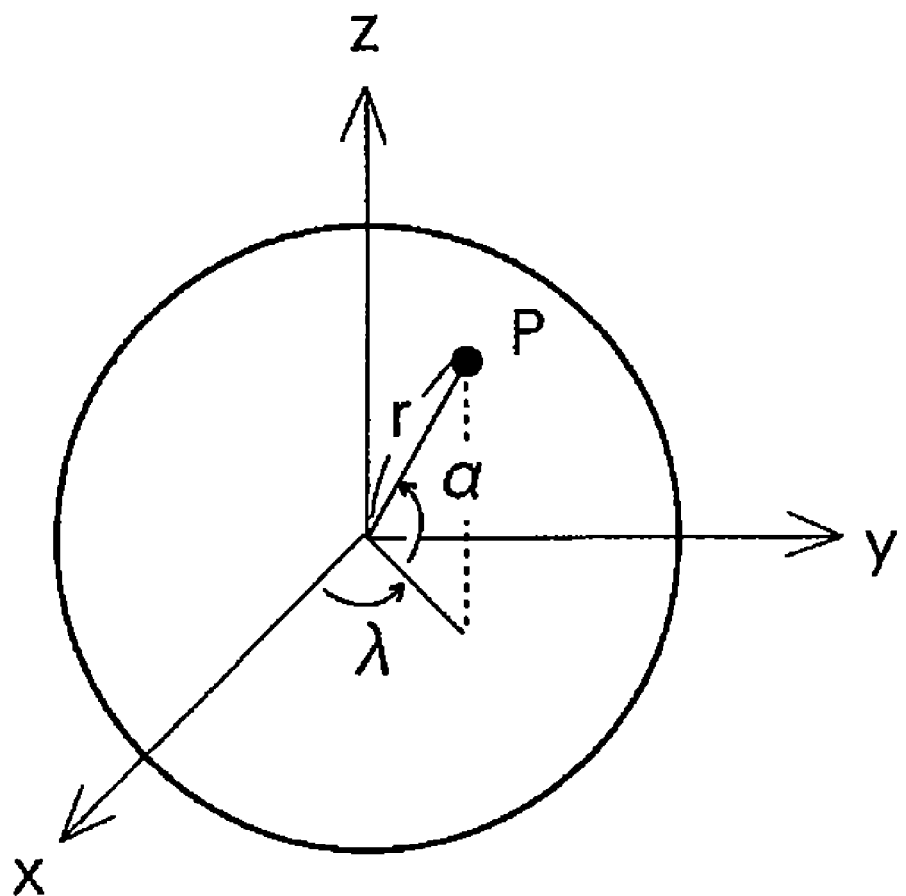
FIG. 4 is a diagram showing a spherical coordinate system and parameters necessary for carrying out the invention, wherein r indicates a radius, a indicates a latitude, and λ indicates a longitude.

Graphic object creation is performed by the coordinate conversion means 31 and the filter processing means 32 for each of the first and second component structured grids (N and E systems). The coordinate conversion means 31 and the filter processing means 32 first perform first and second creation steps according to the method of the present invention. More specifically, a first component structured grid N is set in a first local xyz coordinate system used in computer graphics, and the first structured grid data are disposed on the first component structured grid N, by the coordinate conversion means 31. Next, polygon vertex coordinate values and parameters for colors on the vertices for plotting a kind of drawing specified by the user (such as a color contour or an isosurface) are extracted by the filter processing means 32. Then, polygons are formed by computer graphics technology, thereby obtaining a first graphic object. Then, for setting grid point coordinates on the first component structured grid, the following coordinate conversion is performed according to parameters shown in FIG. 4:

$$x = r \cos \alpha \cdot \cos \lambda$$

$$y = r \cos \alpha \cdot \sin \lambda$$

$$z = r \sin \alpha$$

in which r represents a radius, $\alpha$ represents a latitude, and $\lambda$ represents a longitude. Similarly, a second component structured grid E is set in a second local xyz coordinate system, as in the coordinate conversion described above, and the second structured grid data are disposed on the second component structured grid E, by the coordinate conversion means 31. Then, a second graphic object is obtained by the filter processing means 32, using the computer graphics technology in respect of a specified kind of drawing.

Figure 5:
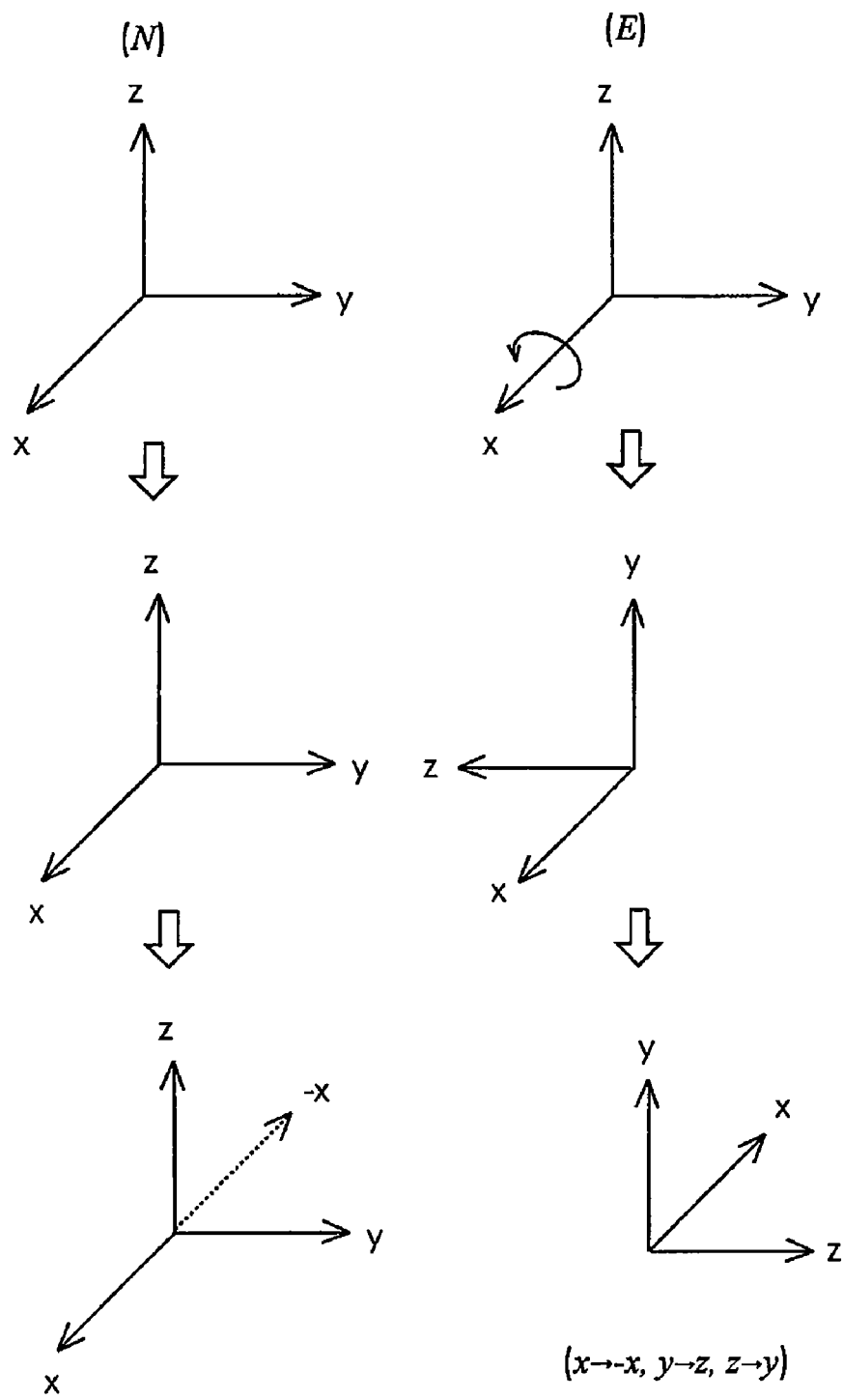
FIG. 5 is an illustration used for explaining rotation of coordinate axes of N and E systems when a rotation operation (step) is performed.
Figure 6:
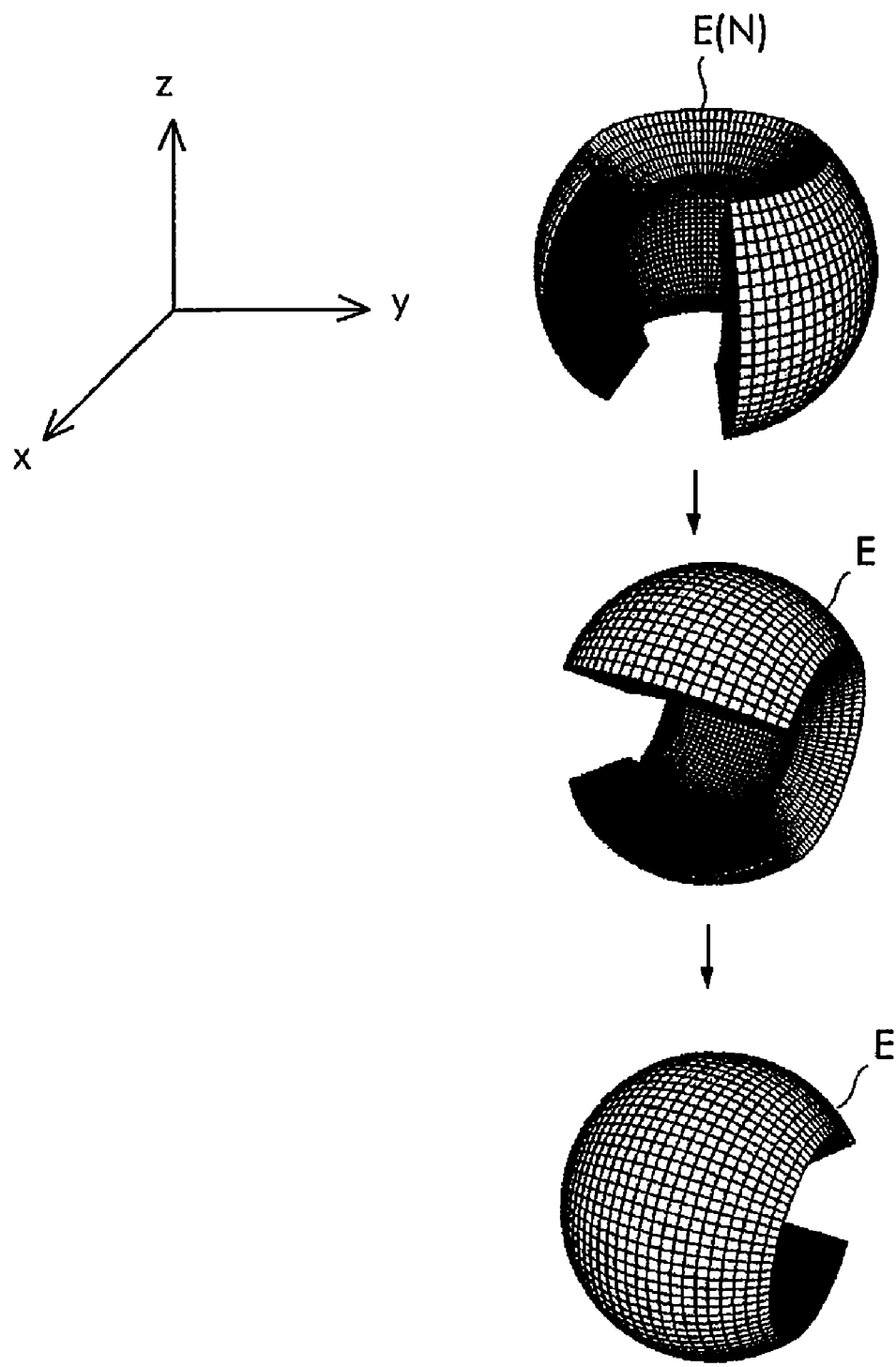
FIG. 6 is an illustration used for explaining a concept when the rotation operation (step) of coordinate systems is performed.

Then, a rotation operation of coordinate systems is performed on the second graphic object on the second component structured grid (of the E system), which has been polygonized, by the E system rotation and N and E system synthesis means 33. The reason why the rotation operation of the coordinate system becomes necessary is: the local xyz coordinate systems used in the computer graphics respectively for the first component structured grid N and the second component structured grid E, which are employed to form the spherical structured grid, have common x, y, z coordinate axes. In other words, the coordinate systems without alteration do not form a spherical structure. FIG. 5 is an illustration for conceptually explaining this rotation operation of the coordinate system. In the rotation operation of the coordinate system (a rotation step), the second graphic object is rotated by 90 degrees with respect to the x axis of the first local xyz coordinate system (coordinate system for the N system on a left side of FIG. 5), together with the second local xyz coordinate system (coordinate system for the E system on a right side of FIG. 5). Then, the second graphic object is rotated by 180 degrees with respect to the z axis of the first local xyz coordinate system (coordinate system for the N system on the left side of FIG. 5). This makes it possible for the first and second graphic objects to form the spherical structured grid complementarily to each other. FIG. 6 illustrates a process of rotating the E system as described above. As a result, using the first component structured grid, rotated second component structured grid, and first and second structured grid data, visualization of the structured grid data on the monitor becomes possible, using the computer graphics technology (a visualization step). In the visualization step, it is determined if there is a region in which the first component structured grid overlaps with the second component structured grid having the rotated coordinates (a determination step). Then, it is preferable to visualize either the structured grid data arranged on either the first component structured grid or the second component structured grid having the rotated coordinates in the overlapping region shown in FIG. 2F.

The E system rotation and N and E system synthesis means 33 synthesizes the graphic object of the first component structured grid and the graphic object of the second component structured grid rotated together with the second local xyz coordinate system, thereby forming the spherical structured grid necessary for the visualization.

Incidentally, as clear from FIG. 6, in order to finally obtain the structured grid shown in a lowest portion of FIG. 6, the coordinate conversion of the second component structured grid may be performed without performing the rotation operation of the coordinate systems that rotates the axes. More specifically, replacement of coordinates of grid points on the second component structured grid may be performed so that the x, y, and z axes for defining coordinate values of respective grid points on the second component structured grid (E) (or the xyz coordinate system of the second graphic object) become −x, z, y axes of the xyz coordinate system for defining coordinate values of grid points on the first component structured grid, respectively, as shown in FIG. 5. In this case, it is necessary to numerically perform coordinate system conversion rather than rotation using the computer graphics technology. When the embodiment in FIG. 1 is used, this conversion will be performed by the coordinate conversion means 31, and the E system rotation and N and E system synthesis means 33 will not perform the rotation of the E system. Also in this manner, the second graphic object necessary for the visualization by the computer graphics technology, can be obtained. Specifically, a first setting step, a second setting step, and a coordinate conversion step are performed. In the first setting step, the coordinate values of grid points on the first component structured grid are set using an xyz coordinate system. In the second setting step, the coordinate values of grid points on the second component structured grid are set using an xyz coordinate system. Then, in the coordinate conversion step, the coordinates of respective grid points on the second component structured grid are converted so that the x, y, and z axes for defining the coordinate values of grid points on the second component structured grid become −x, z, and y axes, respectively, as seen from the xyz coordinate system for defining coordinate values of grid points on the first component structured grid (coordinate conversion step).

The drawing means 34 in FIG. 1 visualizes and displays the structured grid data on the monitor of the display means 35 by the computer graphics technology, using the rotated second graphic object and the first graphic object (visualization step). The image file output means 36 outputs data necessary for visualization to the hard disk 41 of the storage device 4.

Then, by repeating a series of processing by the operation and control portion 1 and the visualization function portion 3 until data block is erased and re-read, or an end operation is performed, this program implements visualization by interacting with the user.

For example, the present invention is applied in the field of nonhydrostatic atmospheric general circulation to visualize simulation result. In the simulation of nonhydrostatic atmospheric general circulation, the number of grid points and a grid interval are globally fixed to be constant in advance due to processing capability of a computer on a plurality of physical quantities with respect to atmospheric contents for the entire earth. However, simulations are locally performed using locally different spatial resolutions. For example, in Japan, a particular local region, a more accurate computation is performed on a smaller scale. When visualization is performed using the program of this embodiment, a visualizing function may be implemented by handling data (divided structured grid data) for each divided block, and setting a resolution for each block. For this reason, the program of this embodiment is effective in handling data on results of simulations using locally different resolutions. The method and the program according to the present invention are not limited to the simulation of the nonhydrostatic atmospheric general circulation, but are effective in efficiently visualizing and displaying, in a spherical form, images of results of a lot of simulations targeting phenomena on the earth.

INDUSTRIAL APPLICABILITY

According to the present invention, the grid structured data arranged for the spherical structured grid constituted by combination of two component structured grids may be visualized by the computer graphics technology.

The invention claimed is:

1. A method of visualizing structured grid data on a monitor using computer graphics technology,
the structured grid data including first and second structured grid data respectively arranged for first and second component structured grids of a spherical structured grid that is constituted by complementarily combining said first component structured grid and said second component structured grid to form a sphere,
said first component structured grid being constituted by extracting from a latitude-longitude grid in a first spherical coordinate system a range between a certain value of −45 degrees or less and a certain value of 45 degrees or more, excluding −90 and 90 degrees, in latitude and a range between a certain value of 45 degrees or less and a certain value of 315 degrees or more, excluding 0 and 360 degrees, in longitude, said first spherical coordinate system using a z axis of an xyz space as a central axis,
said second component structured grid being constituted by extracting from a latitude-longitude grid in a second spherical coordinate system a range between a certain value of −45 degrees or less and a certain value of 45 degrees or more, excluding −90 and 90 degrees, in latitude and a range between a certain value of 45 degrees or less and a certain value of 315 degrees or more, excluding 0 and 360 degrees, in longitude, said second spherical coordinate system using a y axis of the xyz space as a central axis, the method comprising the steps of:

creating a first graphic object using said computer graphics technology after setting said first component structured grid in a first local xyz coordinate system used in computer graphics and disposing the first structured grid data on said first component structured grid;

creating a second graphic object using said computer graphics technology after setting said second component structured grid in a second local xyz coordinate system used in said computer graphics and disposing the second structured grid data on said second component structured grid;

rotating the second graphic object by 90 degrees with respect to an x axis of said first local xyz coordinate system, together with said second local coordinate system, and then rotating the resulting second graphic object by 180 degrees with respect to a z axis of said first local xyz coordinate system;

visualizing a graphic object, which has been obtained by combining the first graphic object and the rotated second graphic object, on said monitor as an image, using said computer graphics technology; and, determining an overlapping region where said first component structured grid overlaps with said rotated second component structured grid, and selecting one or the other of the structured grid data disposed on said first component structured grid and the structured grid data disposed on said second component structured grid, which are to be visualized in the overlapping region, the determination step being implemented in the step of visualizing said graphic object on said monitor, wherein the determining step implements a region determination criterion defined to visualize the selected structured grid data without polygon creation and normal computation on a polygon vertex.

2. The method of visualizing structured grid data according to claim 1, wherein the first and second structured grid data respectively include a plurality of divided structured grid data.

3. The method of visualizing structured grid data according to claim 2, wherein the divided structured data, which are minimally required for representation as the image on said monitor, are selected from among the first and second structured grid data and are visualized.

4. A method of visualizing structured grid data on a monitor using computer graphics technology, the structured grid data including first and second structured grid data respectively arranged for first and second component structured grids of a spherical structured grid that is constituted by complementarily combining said first component structured grid and said second component structured grid to form a sphere, said first component structured grid being constituted by extracting from a latitude-longitude grid in a first spherical coordinate system a range between a certain value of −45 degrees or less and a certain value of 45 degrees or more, excluding −90 and 90 degrees, in latitude and a range between a certain value of 45 degrees or less and a certain value of 315 degrees or more, excluding 0 and 360 degrees, in longitude, said first spherical coordinate system using a z axis of an xyz space as a central axis, said second component structured grid being constituted by extracting from a latitude-longitude grid in a second spherical coordinate system a range between a certain value of −45 degrees or less and a certain value of 45 degrees or more, excluding −90 and 90 degrees, in latitude and a range between a certain value of 45 degrees or less and a certain value of 315 degrees or more, excluding 0 and 360 degrees, in longitude, said second spherical coordinate system using a y axis of the xyz space as a central axis, the method comprising the steps of:

setting a coordinate value to each grid point on said first component structured grid using an xyz coordinate system;

setting a coordinate value to each grid point on said second component structured grid using an xyz coordinate system;

converting the coordinate value of said each grid point on said second component structured grid so that x, y, and z axes for defining the coordinate value of said each grid point on said second component structured grid may respectively become −x, z, and y axes as seen in said xyz coordinate system for defining the coordinate value of said each grid point on said first component structured grid;

visualizing a graphic object on said monitor as an image, using said computer graphics technology, said graphic object being obtained by creating respective graphic objects of said first component structured grid and said second component structured grid having converted coordinate values, using the first and second structured data, and combining the respective graphic objects; and determining an overlapping region where said first component structured grid overlaps with said second component structured grid having said converted coordinate values, and selecting one or the other of the structured grid data disposed on said first component structured grid and the structured grid data disposed on said second component structured grid having the converted coordinate values, which are to be visualized in the overlapping region, the determination step being implemented in the step of visualizing said graphic object on said monitor, wherein the determining step implements a region determination criterion defined to visualize the selected structured grid data without polygon creation and normal computation on a polygon vertex.

5. The method of visualizing structured grid data according to claim 4, wherein the first and second structured grid data respectively include a plurality of divided structured grid data.

6. The method of visualizing structured grid data according to claim 5, wherein the divided structured data, which are minimally required for representation as the image on said monitor, are selected from among the first and second structured grid data and are visualized.

7. A system comprising:

at least one computer; and a program configured to execute in the at least one computer for visualizing structured grid data on a monitor using computer graphics technology, the structured grid data including first and second structured grid data respectively arranged for first and second component structured grids of a spherical structured grid that is constituted by complementarily combining said first component structured grid and said second component structured grid to form a sphere, said first component structured grid being constituted by extracting from a latitude-longitude grid in a first spherical coordinate system a range between a certain value of −45 degrees or less and a certain value of 45 degrees or more, excluding −90 and 90 degrees, in latitude and a range between a certain value of 45 degrees or less and a certain value of 315 degrees or more, excluding 0 and 360 degrees, in longitude, said first spherical coordinate system using a z axis of an xyz space as a central axis, said second component structured grid being constituted by extracting from a latitude-longitude grid in a second spherical coordinate system a range between a certain value of −45 degrees or less and a certain value of 45 degrees or more, excluding −90 and 90 degrees, in latitude and a range between a certain value of 45 degrees or less and a certain value of 315 degrees or more, excluding 0 and 360 degrees, in longitude, said second spherical coordinate system using a y axis of the xyz space as a central axis, the program causing said at least one computer to implement:
- a first creation function of creating a first graphic object using said computer graphics technology after setting said first component structured grid in a first local xyz coordinate system used in computer graphics and disposing the first structured grid data on said first component structured grid;
- a second creation function of creating a second graphic object using said computer graphics technology after setting said second component structured grid in a second local xyz coordinate system used in said computer graphics and disposing the second structured grid data on said second component structured grid;
- a rotation function of rotating the second graphic object by 90 degrees with respect to an x axis of said first local xyz coordinate system, together with said second local coordinate system, and then rotating the resulting second graphic object by 180 degrees with respect to a z axis of said first local xyz coordinate system;
- a visualization function of visualizing a graphic object, which has been obtained by combining the first graphic object and the rotated second graphic object, on said monitor as an image, using said computer graphics technology; and
- a determination function of determining an overlapping region where said first component structured grid overlaps with said rotated second component structured grid, and selecting one or the other of the structured grid data disposed on said first component structured grid and the structured grid data disposed on said second component structured grid, which is visualized in the overlapping region, the determination step being implemented in the visualization function of visualizing said graphic object on said monitor, wherein the determination function implements a region determination criterion defined to visualize the selected structured grid data without polygon creation and normal computation on a polygon vertex.

8. The system of claim 7, wherein the first and second structured grid data respectively include a plurality of divided structured grid data.

9. The system of claim 8, further causing said at least one computer to implement a selection function of selecting the divided structured data, which are minimally required for representation as the image on said monitor, from among the first and second structured gird data, and visualizing the selected divided structured data.

10. An article of manufacture comprising:
a program configured to execute in a computer for visualizing structured grid data on a monitor using computer graphics technology, the structured grid data including first and second structured grid data respectively arranged for first and second component structured grids of a spherical structured grid that is constituted by complementarily combining said first component structured grid and said second component structured grid to form a sphere, said first component structured grid being constituted by extracting from a latitude-longitude grid in a first spherical coordinate system a range between a certain value of −45 degrees or less and a certain value of 45 degrees or more, excluding −90 and 90 degrees, in latitude and a range between a certain value of 45 degrees or less and a certain value of 315 degrees or more, excluding 0 and 360 degrees, in longitude, said first spherical coordinate system using a z axis of an xyz space as a central axis, said second component structured grid being constituted by extracting from a latitude-longitude grid in a second spherical coordinate system a range between a certain value of −45 degrees or less and a certain value of 45 degrees or more, excluding −90 and 90 degrees, in latitude and a range between a certain value of 45 degrees or less and a certain value of 315 degrees or more, excluding 0 and 360 degrees, in longitude, said second spherical coordinate system using a y axis of the xyz space as a central axis, the program causing said computer to implement:
- a first setting function of setting a coordinate value to each grid point on said first component structured grid using an xyz coordinate system;
- a second setting function of setting a coordinate value to each grid point on said second component structured grid using an xyz coordinate system;
- a coordinate conversion function of converting the coordinate of said each grid point on said second component structured grid so that x, y, and z axes for defining the coordinate value of said each grid point on said second component structured grid may respectively become −x, z, and y axes as seen in the xyz coordinate system for defining the coordinate value of said each grid point on said first component structured grid;
- a visualization function of visualizing a graphic object on said monitor as an image, using said computer graphics technology, said graphic object being obtained by creating respective graphic objects of said first and second component structured grids using said first component structured grid, said second component structured grid having the converted coordinate values, said first structured grid data, and said second structured grid data, and combining the respective graphic objects; and
- a determination function of determining an overlapping region where said first component structured grid overlaps with said second component structured grid having the converted coordinate values, and selecting one or the other of the structured grid data disposed on said first component structured grid and the structured grid data disposed on said second component structured grid having the converted coordinate values, which are to be visualized in the overlapping region, the determination step being implemented in the visualization function of visualizing said graphic object on said monitor, wherein the determination function implements a region determination criterion defined to visualize the selected structured grid data without polygon creation and normal computation on a polygon vertex.

11. The article of manufacture of claim 10, wherein the first and second structured grid data respectively include a plurality of divided structured grid data.

12. The article of manufacture of claim 11, the program further causing said computer to implement a selection function of selecting the divided structured data, which are minimally required for representation as the image on said monitor, from among the first and second structured grid data, and visualizing the selected structured grid data.

* * * * *